US009074711B2

(12) United States Patent
Huang

(10) Patent No.: US 9,074,711 B2
(45) Date of Patent: Jul. 7, 2015

(54) AXIALLY EXPANSIBLE PIPE ASSEMBLY

(71) Applicant: Huang Fu Huang, Changhua County (TW)

(72) Inventor: Huang Fu Huang, Changhua County (TW)

( * ) Notice: Subject to any disclaimer, the term of this patent is extended or adjusted under 35 U.S.C. 154(b) by 84 days.

(21) Appl. No.: 14/012,955

(22) Filed: Aug. 28, 2013

(65) Prior Publication Data
US 2015/0061281 A1    Mar. 5, 2015

(51) Int. Cl.
*F16L 31/00*    (2006.01)
*F16L 39/00*    (2006.01)

(52) U.S. Cl.
CPC ..................... *F16L 39/005* (2013.01)

(58) Field of Classification Search
USPC .................. 138/118, 119; 285/222.1, 242
See application file for complete search history.

(56) References Cited

U.S. PATENT DOCUMENTS

| | | | | |
|---|---|---|---|---|
| 4,923,223 A * | 5/1990 | Seckel | ...................... | 285/148.13 |
| 5,468,129 A * | 11/1995 | Sunden et al. | ............ | 417/477.12 |
| 5,662,144 A * | 9/1997 | Lo et al. | .......................... | 138/119 |
| 5,918,640 A * | 7/1999 | Orcutt | ............................ | 138/109 |
| 6,098,666 A * | 8/2000 | Wells et al. | ..................... | 138/115 |
| 6,113,153 A * | 9/2000 | Yang | ................................. | 285/55 |
| 8,291,941 B1 * | 10/2012 | Berardi | .......................... | 138/118 |
| 8,291,942 B2 * | 10/2012 | Berardi | .......................... | 138/118 |
| 8,479,776 B2 * | 7/2013 | Berardi | .......................... | 138/118 |
| 8,757,213 B2 * | 6/2014 | Berardi | .......................... | 138/118 |
| 2005/0087251 A1 * | 4/2005 | Sumitomo | ..................... | 138/177 |
| 2005/0115622 A1 * | 6/2005 | Bennett et al. | ................. | 138/119 |
| 2005/0246855 A1 * | 11/2005 | Stockton et al. | ................. | 15/323 |
| 2007/0000550 A1 * | 1/2007 | Osinski | ........................... | 138/118 |
| 2010/0006171 A1 * | 1/2010 | Tomlin et al. | .................. | 138/104 |

* cited by examiner

*Primary Examiner* — Aaron Dunwoody

(57) ABSTRACT

An axially expansible pipe assembly includes at least one internal pipe and an external pipe. The internal pipe is axially and radially expansible. The external pipe is only axially expansible. The axially expansible external pipe is used to wrap the internal pipe and confine radial expansion of the axially and radially expansible internal pipe in a predetermined range.

12 Claims, 6 Drawing Sheets

AXIALLY EXPANSIBLE PIPE ASSEMBLY

BACKGROUND OF INVENTION

1. Field of Invention

The present invention relates to a pipe and, more particularly, to an axially expansible pipe assembly.

2. Related Prior Art

A conventional pipe assembly includes an internal pipe inserted in an external pipe. The internal pipe is expansible while the external pipe is not. The external diameter of the internal pipe is smaller than the internal diameter of the external pipe when the internal pipe is not expanded. Hence, there is a gap between the internal and external pipes. The gap allows the internal pipe to expand when the internal pipe is filled with water. The expansion of the internal pipe in the radial direction suppresses the expansion of the internal pipe in the axial direction. The length of the internal pipe is smaller than that of the external pipe when the internal pipe is not expanded. When the internal pipe is not expanded, there are inevitably wrinkles on the external pipe because the external pipe does not shrink. The wrinkles render the conventional pipe assembly aesthetically unpleasant. Moreover, it is difficult to turn the pipe assembly into a roll. The internal pipe becomes too thin to survive high hydraulic pressure when it is filled with water.

Therefore, the present invention is intended to obviate or at least alleviate the problems encountered in prior art.

SUMMARY OF INVENTION

It is the primary objective of the present invention to provide a robust axially expansible pipe assembly.

To achieve the foregoing objective, the axially expansible pipe assembly includes at least one axially and radially expansible internal pipe and an axially expansible external pipe. The axially expansible external pipe is used to wrap the internal pipe and confine radial expansion of the axially and radially expansible internal pipe in a predetermined range.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
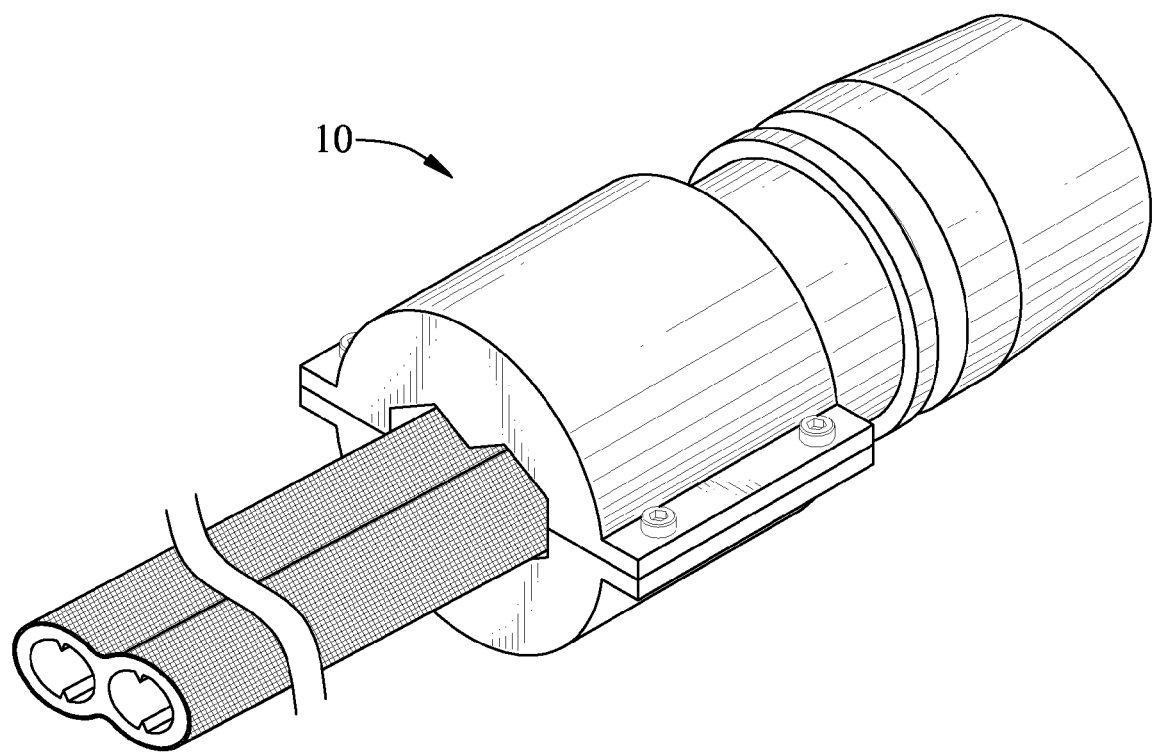
FIG. 1 is a perspective view of an axially expansible pipe assembly according to the preferred embodiment of the present invention.
Figure 2:
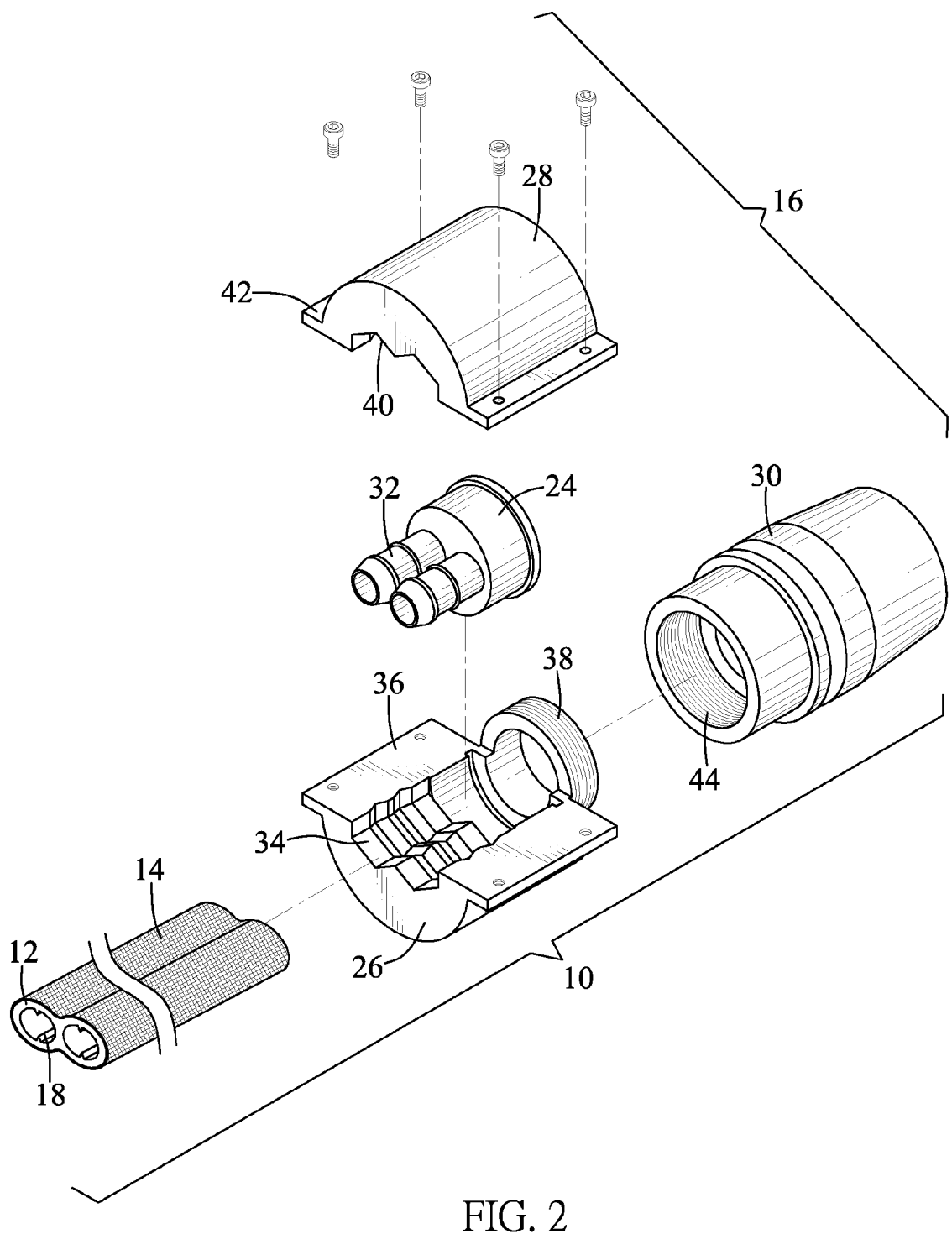
FIG. 2 is an exploded view of the axially expansible pipe assembly shown in FIG. 1.

Referring to FIGS. 1 and 2, there is an axially expansible pipe assembly 10 according to the preferred embodiment of the present invention. The axially expansible pipe assembly 10 includes two internal pipes 12, an external pipe 14 and a joint unit 16.

The internal pipes 12 are made one in the preferred embodiment. However, the internal pipes 12 can be made independent of each other in another embodiment. The internal pipes 12 are made of an extremely elastic water-tight material so that they are highly expansible and can keep water therein. Each of the internal pipes 12 includes two ribs 18 axially extending on an internal side. The internal pipes 12 suffer jams less with the ribs 18 than without.

Figure 3:
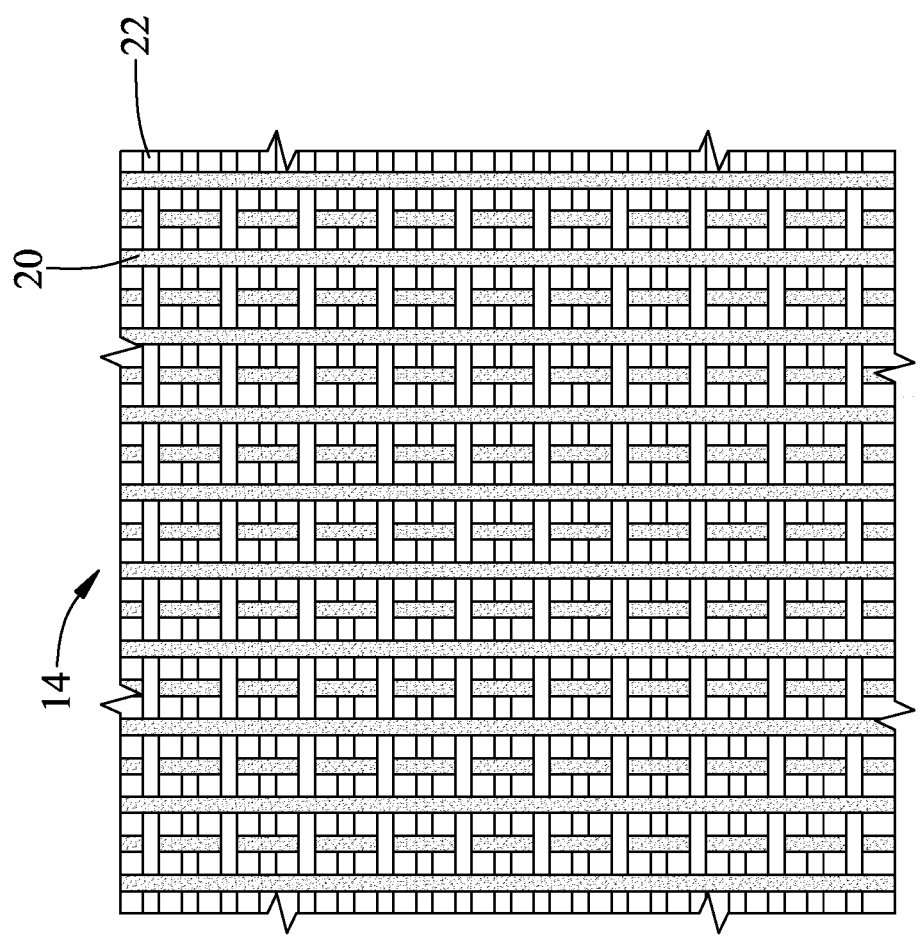
FIG. 3 is a partial, side view of an external pipe of the axially expansible pipe assembly shown in FIG. 1.
Figures 4, 5:
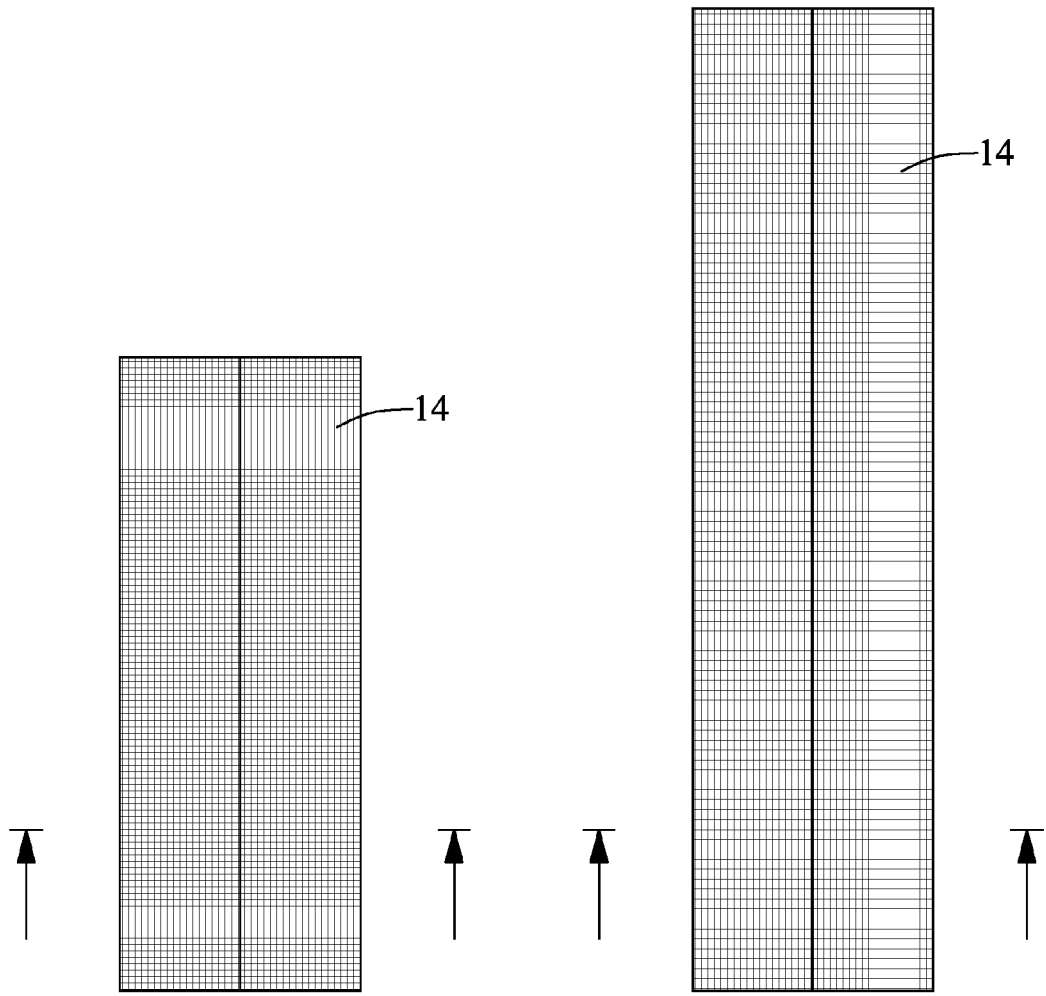
FIG. 4 is a partial, side view of the axially expansible pipe assembly shown in FIG. 1.
FIG. 5 is a side view of the axially expansible pipe assembly in an expanded position other than a non-expanded position shown in FIG. 4.

Referring to FIGS. 3 through 5, the external pipe 14 is a fabric that includes warps 20 and woofs 22. The warps 20 are made of an extremely elastic material so that they are highly expansible. The woofs 22 are made of a non-elastic material so that they are not expansible. The external pipe 14 is made of the fabric so that the warps 20 extend parallel to the axial direction thereof and that the woofs 22 extend perpendicular to the warps 20. Hence, the external pipe 14 is axially expansible but not radially expansible.

Figure 6:
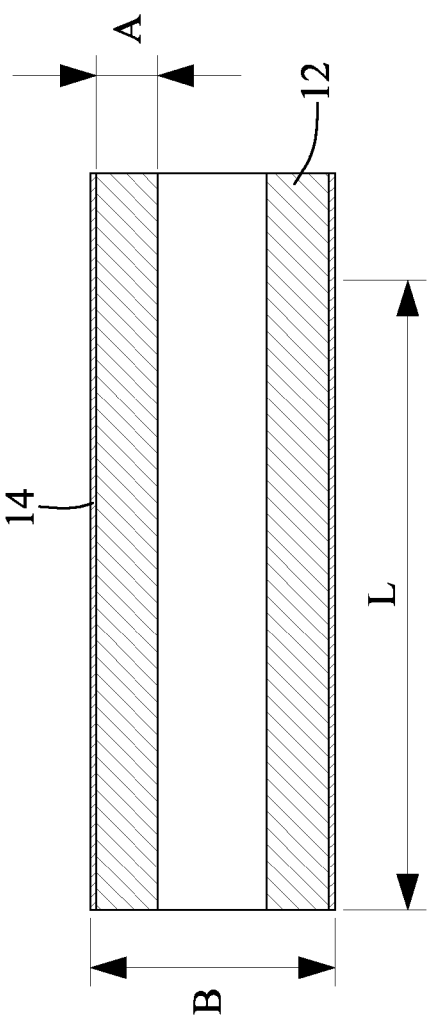
FIG. 6 is a cross-sectional view of the axially expansible pipe assembly shown in FIG. 4.
Figure 8:
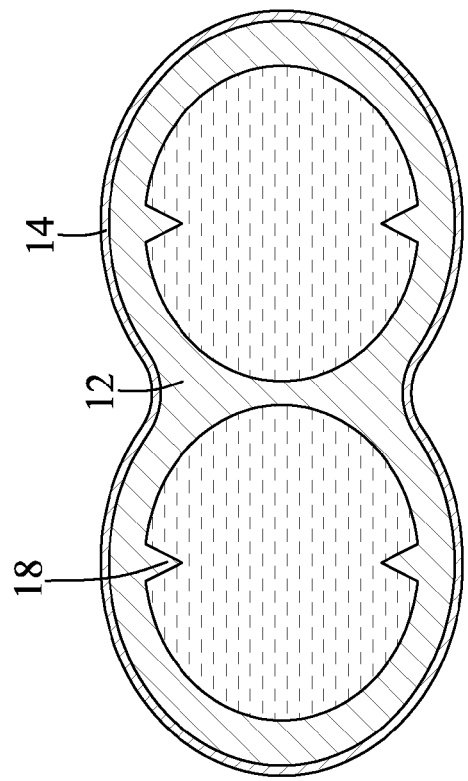
FIG. 8 is another cross-sectional view of the axially expansible pipe assembly shown in FIG. 4.

Referring to FIGS. 6 and 8, the length of the internal pipes 12 and the external pipe 14 is at a value of L and the thickness of the internal pipes 12 is at a value of A when the internal pipes 12 are empty.

Figure 7:
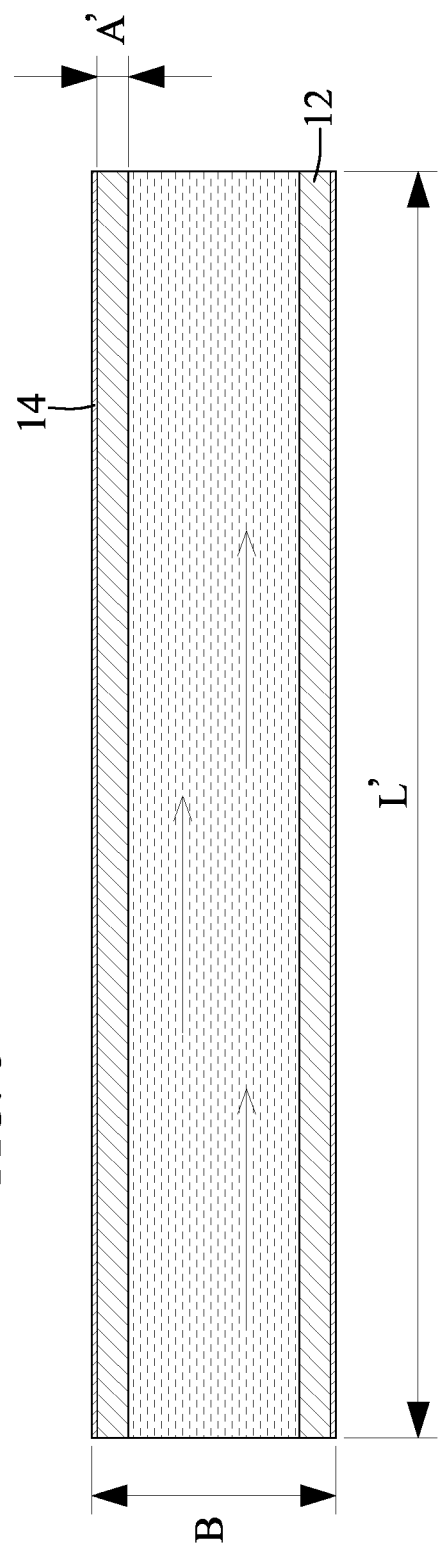
FIG. 7 is a cross-sectional view of the axially expansible pipe assembly shown in FIG. 5.
Figure 9:
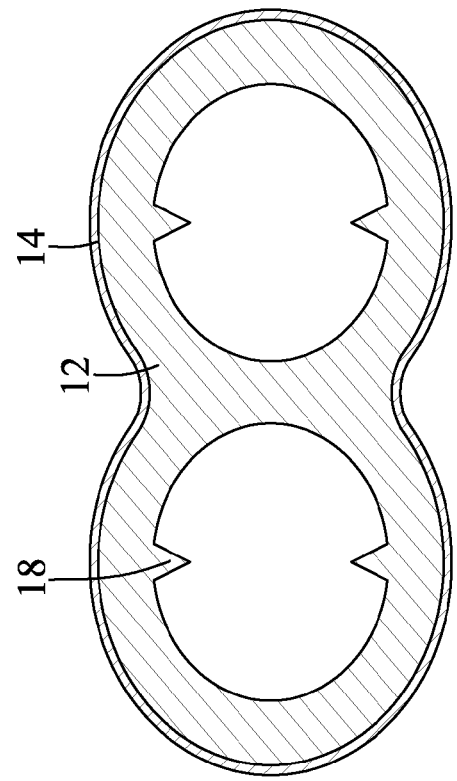
FIG. 9 is another cross-sectional view of the axially expansible pipe assembly shown in FIG. 5.

Referring to FIGS. 7 and 9, the length of the internal pipes 12 and the external pipe 14 is at a value of L' and the thickness of the internal pipes 12 is at a value of A' when the internal pipes 12 are filled with water. The value L' is larger than the value L. The value A' is smaller than the value A. The internal pipes 12 are radially expanded to a predetermined extent so that they are restrained by the external pipe 14 which is not radially expansible for using the non-expansible woofs 22.

The axially expansible pipe assembly 10 exhibits advantages over the prior art. At first, the external sides of the internal pipes 12 can be supported by the internal side of the external pipe 14 when the internal pipes 12 are expanded. The radial expansion of the internal pipes 12 is limited to the predetermined extent since they are restrained by the external pipe 14 which is not radially expansible for using the non-expansible woofs 22.

Secondly, the length of the internal pipes 12 is identical to that of the external pipe 14 when the internal pipes 12 are not expanded, i.e., not filled with water. There is no wrinkle on the external pipe 14. Hence, the axially expansible pipe assembly 10 is aesthetically pleasant. Moreover, it is easy to turn the axially expansible pipe assembly 10 into a roll.

Thirdly, the internal pipes 12 is radially expansible to the predetermined extent since they are restrained by the external pipe 14 which is not radially expansible for using the non-expansible woofs 22. Therefore, the internal pipes 12 expand axially more than radially.

Fourthly, the internal pipes 12 would not become too thin when they are filled with water because their expansion is mostly in the axial direction. Hence, the internal pipes 12 would survive higher hydraulic pressure than the prior art.

Fifthly, the ribs 18 avoid excessive bending of the internal pipes 12 and hence prevent jams of the internal pipes 12.

Referring to FIG. 2 again, the joint unit 16 includes a core 24, a lower shell 26, an upper shell 28 and a mouth piece 30. The core 24 is a hollow element with includes two tubes 32.

The lower shell 26 includes a recess 34 for receiving the combination of the internal pipes 12 with the external pipe 14. The lower shell 26 further includes two fins 36 extending from two opposite sides and a thread 38 extending on an annular portion formed at an end.

The upper shell 28 includes a recess 40 and two fins 42. The upper shell 28 is identical to the lower shell 26 except that it does not include any threaded portion.

The mouth piece 30 includes a thread 44 extending on an internal side. The thread 44 is made corresponding to the thread 38.

In assembly, the tubes 32 are inserted in the internal pipes 12. The external diameter of the tubes 32 is larger than the internal diameter of the internal pipes 12 so that the tubes 32 are fit in the internal pipes 12. The lower shell 26 and the upper shell 28 are placed on the combination of the internal pipes 12 with the external pipe 14. The lower shell 26 is secured to the upper shell 28 by screws (not numbered). The internal transverse size of the recesses 34 and 40 is smaller than the external transverse size of the combination of the internal pipes 12 with the external pipe 14 so that the combination of the lower shell 26 with the upper shell 28 is in tight contact with the external pipe 14. Hence, the combination of the internal pipes 12 with the external pipe 14 is firmly connected to the joint unit 16. The thread 44 is engaged with the thread 38 to connect the mouth piece 30 to the lower shell 26.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An axially expansible pipe assembly including:
   at least one axially and radially expansible internal pipe; and
   an axially expansible but radially non-expansible external pipe for wrapping the internal pipe and confining radial expansion of the axially and radially expansible internal pipe.

2. The axially expansible pipe assembly according to claim 1, wherein the external pipe is made of a fabric that is only expansible in the axial direction.

3. The axially expansible pipe assembly according to claim 2, wherein the fabric includes elastic warps extending parallel to the axial direction of the external pipe and non-elastic woofs extending perpendicular to the elastic warps.

4. The axially expansible pipe assembly according to claim 1, wherein the internal pipe is made with an external diameter at least identical to an internal diameter of the external pipe.

5. The axially expansible pipe assembly according to claim 1, wherein the internal pipe includes at least one rib axially extending on an internal side.

6. The axially expansible pipe assembly according to claim 1, including two internal pipes wrapped in the external pipe.

7. The axially expansible pipe assembly according to claim 6, wherein the internal pipes are made one.

8. The axially expansible pipe assembly according to claim 1, including a joint unit connected to the internal pipe and the external pipe.

9. The axially expansible pipe assembly according to claim 8, wherein the joint unit includes a core partially inserted in the internal pipe and two shells for placed around the external pipe.

10. The axially expansible pipe assembly according to claim 9, wherein the core includes at least one tube inserted in the internal pipe.

11. The axially expansible pipe assembly according to claim 10, wherein each of the shells includes a recess for receiving the external pipe.

12. The axially expansible pipe assembly according to claim 11, wherein the tube is made with an external diameter larger than an internal diameter of the internal pipe, wherein the recesses of the shells are made with an internal diameter smaller than the external diameter size of the external pipe.

* * * * *